(12) United States Patent
Regnery et al.

(10) Patent No.: US 8,105,403 B2
(45) Date of Patent: Jan. 31, 2012

(54) INTEGRATION OF AN INTEGRATED GASIFICATION COMBINED CYCLE POWER PLANT AND COAL TO LIQUID FACILITY

(75) Inventors: Joseph A. Regnery, Castle Rock, CO (US); Richard O. Sheppard, Evergreen, CO (US)

(73) Assignee: Rentech, Inc., Los Angeles, CA (US)

( * ) Notice: Subject to any disclaimer, the term of this patent is extended or adjusted under 35 U.S.C. 154(b) by 730 days.

(21) Appl. No.: 12/210,728

(22) Filed: Sep. 15, 2008

(65) Prior Publication Data

US 2009/0090057 A1    Apr. 9, 2009

Related U.S. Application Data

(60) Provisional application No. 60/972,450, filed on Sep. 14, 2007, provisional application No. 60/972,522, filed on Sep. 14, 2007.

(51) Int. Cl.
*C10J 3/00* (2006.01)
*C10G 2/00* (2006.01)

(52) U.S. Cl. ........ 48/197 R; 48/202; 423/650; 423/651; 423/652; 252/373; 518/700; 518/702; 518/703; 518/704; 518/705; 60/39.12

(58) Field of Classification Search ................ 48/197 R, 48/202; 423/650, 651, 652; 252/373; 518/700, 518/702, 703, 704, 705; 60/39.12

See application file for complete search history.

(56) References Cited

U.S. PATENT DOCUMENTS

| | | | |
|---|---|---|---|
| 5,877,350 | A | 3/1999 | Langer et al. |
| 6,368,366 | B1 | 4/2002 | Langer et al. |
| 6,368,367 | B1 | 4/2002 | Langer et al. |
| 6,383,237 | B1 | 5/2002 | Langer et al. |
| 6,596,780 | B2 | 7/2003 | Jahnke et al. |
| 6,976,362 | B2 | 12/2005 | Sheppard et al. |
| 2003/0043690 | A1 | 3/2003 | Holl |
| 2003/0192235 | A1* | 10/2003 | French et al. ............. 44/572 |
| 2004/0052158 | A1 | 3/2004 | Holl |
| 2005/0033069 | A1 | 2/2005 | Holl et al. |
| 2009/0094141 | A1 | 4/2009 | Regnery et al. |
| 2010/0018217 | A1* | 1/2010 | Boshoff et al. .............. 60/780 |
| 2010/0022666 | A1* | 1/2010 | Boshoff et al. ............. 518/702 |

FOREIGN PATENT DOCUMENTS

| | | |
|---|---|---|
| KR | 10200700086408 A | 1/2007 |
| KR | 1020070048149 A | 5/2007 |
| WO | WO 2010/057222 A2 * | 5/2010 |

* cited by examiner

*Primary Examiner* — Timothy Vanoy
(74) *Attorney, Agent, or Firm* — Porter Hedges LLP; Timothy S. Westby

(57) ABSTRACT

A novel method of combining the CTL fuel plant and IGCC electrical plant by sharing the systems of coal intake, coal preparation, gas separation, and water units is described herein. This configuration allows for the combined facility to offer advantages in efficiencies of production, operational flexibility, scalability, and reliability by a multi-path integration of the processing units.

24 Claims, 4 Drawing Sheets

INTEGRATION OF AN INTEGRATED GASIFICATION COMBINED CYCLE POWER PLANT AND COAL TO LIQUID FACILITY

This application claims the benefit under 35 U.S.C. §119 (e) of U.S. Provisional patent application No. 60/972,450, filed Sep. 14, 2007, and Application No. 60/972,522, filed Sep. 14, 2007, the disclosures of which are incorporated herein by reference in their entirety for all purposes.

BACKGROUND

1. Field of the Invention

This invention relates generally to the field of clean coal energy production. More specifically, the invention relates to a method of combining two clean coal processes into a single facility.

2. Background of the Invention

Natural gas, coal deposits, and biomass are abundant energy sources that often serve as fuel for power generation. The United States has significant known reserves of coal, and coal currently burned for power generation represents only a fraction of the total deposits that are available. This coal used for power satisfies approximately one-half of the electrical energy demand of the United States. Current and tightening emissions regulations limit the amount of sulfur, oxides of nitrogen, and greenhouse gas emissions, making coals high in these materials less favorable for electricity generation. Failure to comply with these regulations results in hefty penalties in the form of fines, shutdowns, and limited operations. Further, upgrading of current coal burning electric generation plants requires substantial investment. With increased awareness of environmental issues such as global warming, and greenhouse gases, this trend is predicted to continue, potentially making coal-burning plants unfavorable and expensive to operate.

Rising worldwide oil demand has increased the cost of oil distillates and encouraged development of alternative clean power facilities. One such power production facility is the Integrated Gasification Combined Cycle (IGCC) plant. Electricity is produced from the combustion of a synthesis gas (syngas) produced by the gasification of coal. Gasification is a method of reacting coal with limited oxygen at high temperatures for the production of synthesis gas. The process of gasification removes potential pollutants such as mercury, arsenic, nitrogen oxides, and sulfur oxides. Further benefits are realized when syngas is combusted, as the burning of syngas releases lower amounts of carbon dioxide. The lowered carbon dioxide emissions and technological advances make these facilities "capture ready," since stored carbon dioxide from the coal is removed in the gasifier.

Conventional steam turbines require pressure, temperature, and corrosion resistant components to generate electricity. The limitations of these components dictate the upper range of the steam temperatures, and therefore limit efficiency of electric power production. In the case of an IGCC gas turbine, the same limitations do not apply. The gas turbine has a higher gas cycle firing temperature that feeds the compressor, burner, and turbine systems as a means of electricity production. The high-temperature exhaust-gas output of the turbine can be used to heat steam for a supplemental steam turbine, thereby increasing the overall efficiency of an electrical power plant.

Coal may also be converted to a synthetic liquid fuel by the conversion of syngas. Liquid fuels have an advantage over coal in that they are easily transported long distances without expensive processes or packaging. The process of converting coal to a liquid fuel typically involves a catalytic reaction of syngas to form liquid hydrocarbons. Fischer-Tropsch (FT) reactor facilities execute the vital step of catalyzed synthesis of petroleum substitute liquid fuels. The process occurs via a catalyzed chemical reaction in which the carbon monoxide and hydrogen in syngas are converted into liquid hydrocarbons. The production of liquid hydrocarbon fuels from solid material reduces dependence on oil distillates for fuels. The hydrocarbon production reaction is highly exothermic, and requires a cooled reactor to maintain conditions favorable for continued synthesis.

The IGCC and CTL process represent two potential clean coal processes to reduce dependence on oil distillates. The former provides clean electrical power and the latter provides liquid hydrocarbons for further processing into products. Additionally, both processes require coal processing, air separation, and syngas production for operation. The current costs of material, process, capital, and infrastructure make individual investments in these processes expensive rendering them unfavorable for development. Previous discussions on the combination of facilities for these processes have centered on their shared starting material and parallel infrastructure requirements for the production of syngas. However, it is recognized that providing a singular source of syngas to operate a plurality of clean coal plants is disadvantageous for operational flexibility, the capacity to scale output to demand, and maintain production during maintenance, or in the case of a device failure.

Accordingly, there is a need in industry for a method of integrating IGCC and CTL facilities with operational flexibility, scalable output, and online maintenance.

BRIEF SUMMARY

These and other needs in the art are addressed in an embodiment of an integrated Coal to Liquid and Integrated Gasification Combined Cycle facility described herein. A novel method of combining a CTL fuel plant and an IGCC electrical plant by sharing the systems of coal intake, coal preparation, gas separation, and water units is described herein. This configuration allows the combined facility to offer advantages in efficiency of production, operational flexibility, scalability, and reliability by a multi-path integration of the processing units.

In embodiments, coal is received by the plant, and prepared for gasification in handling and preparation units. Additionally, air is separated into oxygen for gasification, and nitrogen for the IGCC gas turbine unit in a shared unit. The prepared coal and gas are routed to the CTL section or the IGCC section of the integrated facility. The direction of the processed materials transportation depends on factors involving the profitability of a given product, the quantity of processed material necessary to produce the product, and the maintenance status of the equipment. The production and purification of synthesis gas, or syngas occurs in the gasification and purification units, which both sections retain. An aspect of the disclosed process is that the produced syngas in one section may be provided to the adjacent section depending upon the profitability of a given product, the quantity of processed material necessary to produce the product, and the maintenance status of the equipment.

Byproduct, waste, or tail gases from the CTL section of the facility may be utilized in the IGCC section as a fuel for the gas turbines. In some cases the syngas feed stream to the CTL is not processed, thereby exiting the reactor for gaseous transportation to the IGCC section. These gases may also be recycled to increase the liquid product from the CTL Fischer- Tropsch reactor unit. Water and wastewater units may be shared between the sections of the facility.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following descriptions and claims to refer to particular system components. This document does not intend to distinguish between components that differ in name but not function.

In the following discussion and in the claims the term "IGCC" is used to refer to an Integrated Gasification Combined Cycle electricity generation plant or facility. Similarly, the term "CTL" or "coal to liquid" is used to refer to a Fischer-Tropsch reactor based plant for the synthesis of liquid hydrocarbons from coal, or coal products without limitation by the individual processes involved. Additionally, the term syngas refers to a gaseous mixture comprised of varying amounts of the main components carbon monoxide and hydrogen with potentially other gaseous molecules.

In further discussion the term "facility", "section" and "unit" are used in open ended fashion and thus should be interpreted to mean a premises for a system of components for the execution of a step, or series of steps and associated devices, or apparatuses within the described process.

In the following discussion and in the claims, the terms "including" and "comprising" are used in an open-ended fashion, and thus should be interpreted to mean "including, but not limited to . . . ."

DETAILED DESCRIPTION OF THE PREFERRED EMBODIMENTS

Figure 1:
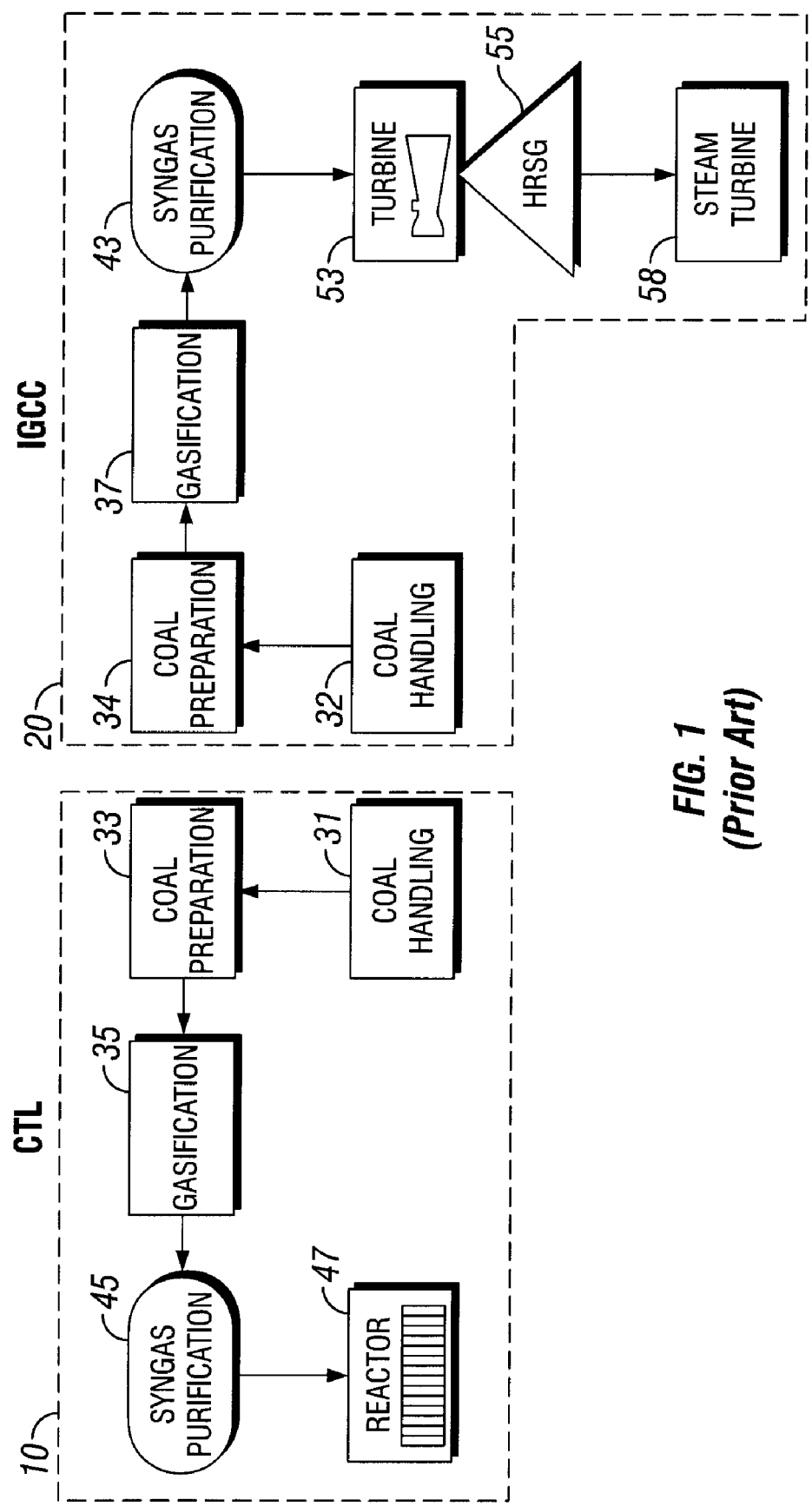
FIG. 1 illustrates a schematic of non-integrated operations of IGCC and CTL plants.

Reference will now be made to FIG. 1, that illustrates the components of non-integrated facilities for coal to liquid (CTL) fuel production 10 and an integrated gasification combined cycle (IGCC) power plant 20 in a side-by-side manner. CTL facility 10 comprises a Fischer-Tropsch Reactor 47 for the production of liquid hydrocarbons. IGCC facility 20 comprises IGCC gas turbine 53 for the combustion of syngas to produce electricity. Further, FIG. 1 illustrates the parallel or similar coal processing steps used in both the facilities. For example without limitation, these may include coal handling 31, 32 coal preparation 33, 34 and gasifier (gasification unit) 35, 37, and syngas purifier 43, 45. Additionally, both facilities may comprise a process for gas treatment, water treatment, wastewater treatment, waste removal and/or similar processes understood by one skilled in the art.

Figure 2:
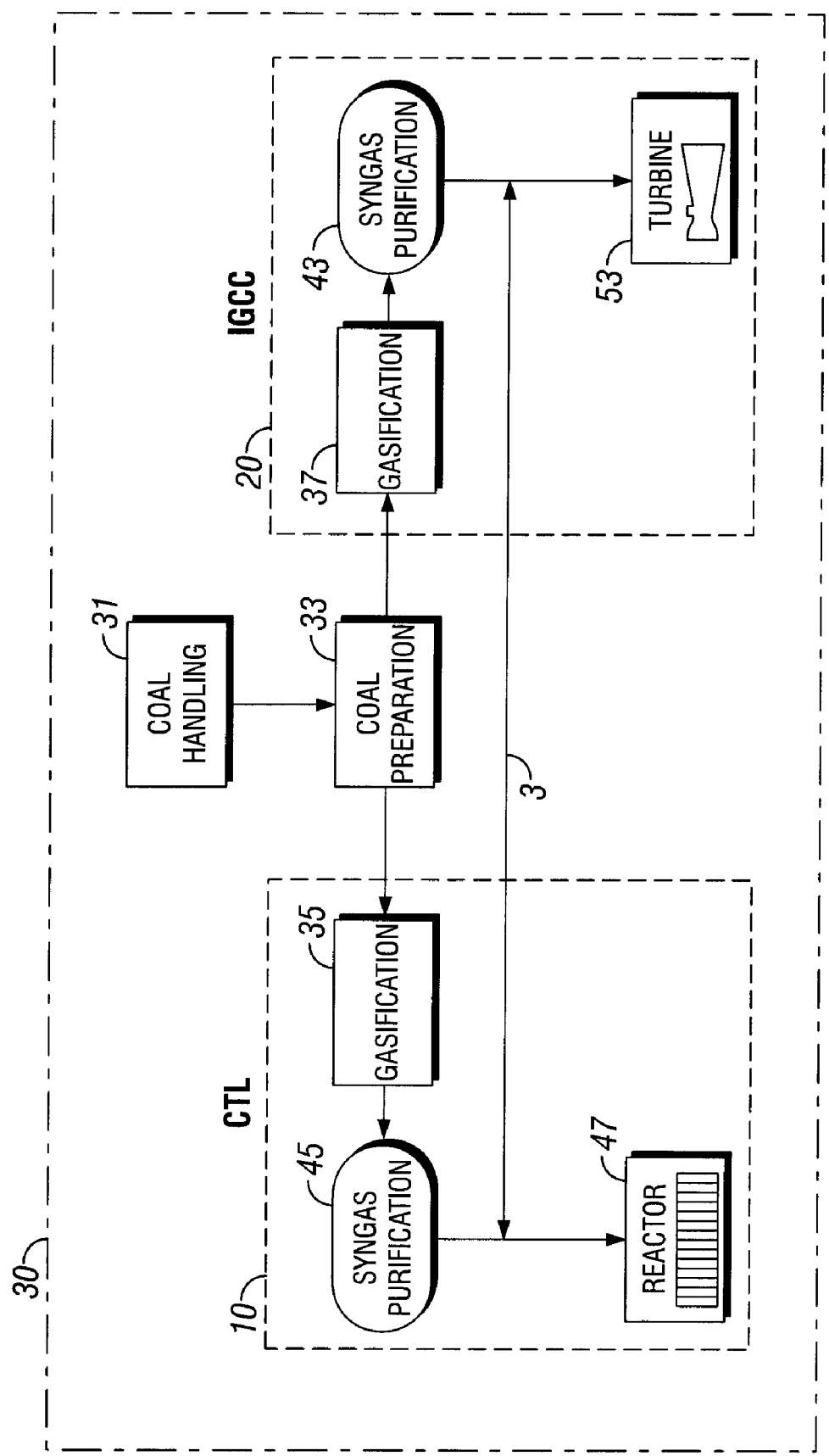
FIG. 2 illustrates a process flow diagram according to one embodiment of the method of integrating operations of IGCC and CTL plants.

In an embodiment, the disclosed process comprises a multi-path means to integrate the CTL 10 and IGCC 20 facilities. FIG. 2 illustrates a novel integrated facility 30 incorporating an integrated IGCC electrical plant section 20 and a CTL Fischer Tropsch liquid hydrocarbon production section 10. In an embodiment, the coal handling 31, and coal preparation 33 units from the CTL facility 10 are shared between both sections. Alternatively, it can be envisioned that the coal handling 31 and coal preparation 33 units are derived from the IGCC facility 20 coal handling 32 and coal preparation 34 units. Coal delivered to the facility arrives at the coal-handling unit 31, before being moved to the coal preparation unit 33. The coal is moved between units by conveyors, trucks, slides or other means as known to one skilled in the art.

Determination of which section requires coal for operations is made and the coal is distributed to the CTL gasification unit 35, the IGCC gasification unit 37, or both. The facility receiving the coal may be considered the receiving facility. Alternatively, the facility without active coal reception may be considered the opposite facility. Coal delivered to the CTL facility 10 is processed through gasification 35, and syngas purification 45 to feed syngas stream 3. Coal delivered to IGCC facility 20 is processed through gasification 37 and syngas purification 43 to feed syngas stream 3.

The section of the integrated facility 30 receiving and processing coal from the coal preparation unit 33 determines the scale and operations of the opposing side. For instance, the IGCC facility 20 has a contract to produce a certain amount of electrical power from IGCC gas turbine 53. In order to satisfy that contract, IGCC facility 20 uses at least a portion of the output from coal preparation unit 33 through IGCC gasifier 37 and syngas preparation 43. CTL facility 10 and associated CTL gasifier 35 and syngas purification 45 only utilize remaining portion of coal. In further embodiments, the receiving facility uses all coal; alternatively a portion thereof. Further, the opposing facility may supplement syngas stream 3, which is routed to receiving facility in order to boost production.

In preferred embodiments, syngas stream 3 is a shared between the CTL facility 10 and the IGCC facility 20. Syngas stream 3 is routed from either section of the integrated facility 30 to the other. For instance, syngas stream 3 is routed from the CTL facility 10 to the IGCC facility 20, and vice versa, without limitation. In an exemplary situation, where maintenance requires the temporary shut down of the IGCC gasifier 37, syngas stream 3 may be routed from the CTL syngas purifier 45 to the IGCC plant 20. In certain embodiments, gasification units 35, 37 and syngas purification 43, 45 may contribute to syngas stream 3 between the facilities.

Figure 3:
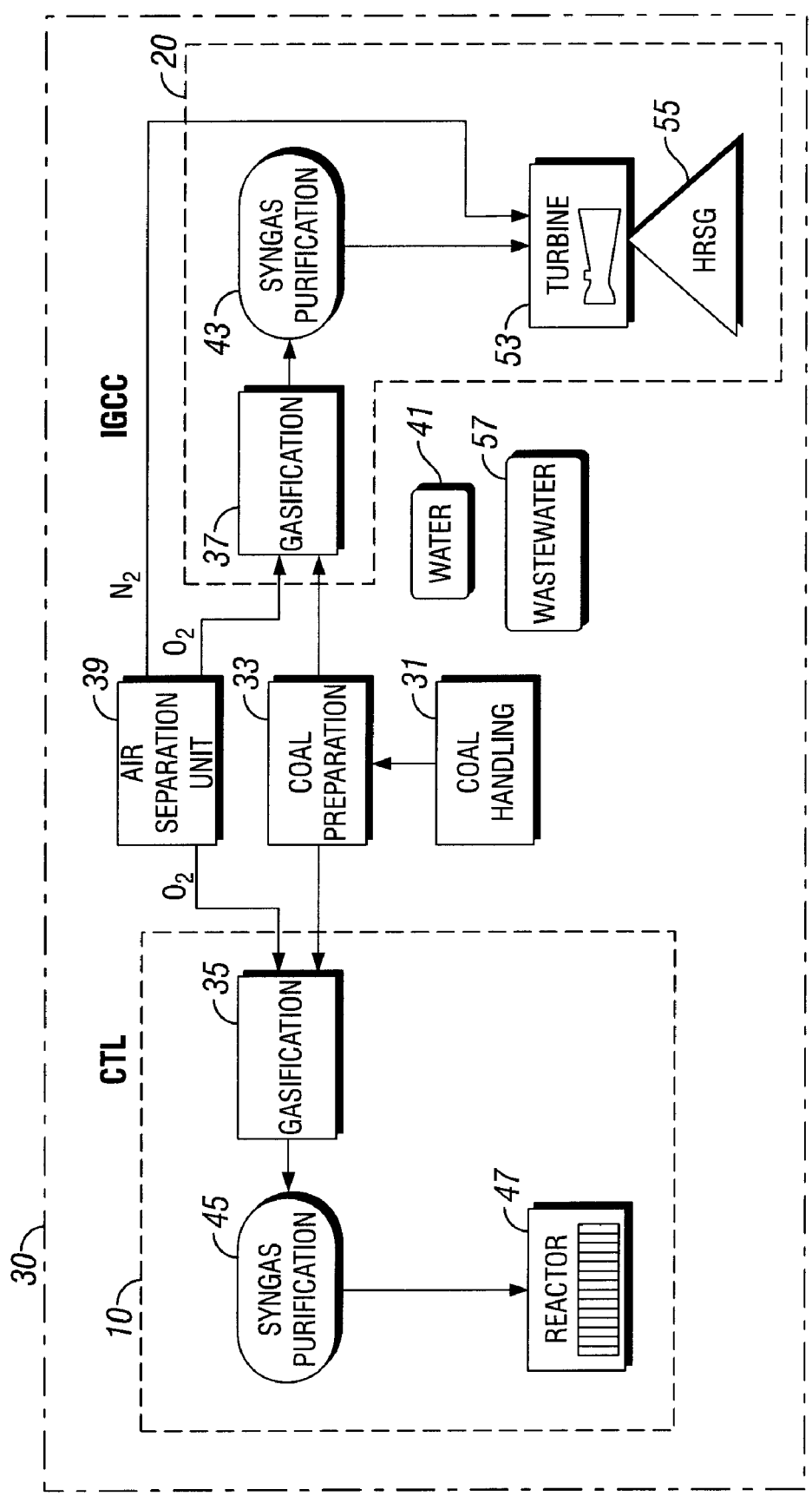
FIG. 3 illustrates a detailed process flow diagram according to one embodiment of the method of integrating operations of IGCC and CTL plants.

Referring now to FIG. 3, gases required for the gasification of coal are processed and separated in the Air Separation Unit (hereinafter ASU) 39 of the integrated facility 30. The CTL gasification 35 and IGCC gasification 37 units include their own air separation units. Preferably, the CTL gasification 35 and IGCC gasification 37 units share a single ASU 39. The primary gas required is oxygen, which is distributed to the CTL gasifier 35, the IGCC gasifier 37, or both for the oxidation of coal and production of syngas. As previously discussed in regards to coal, the rate of delivery, and the facility receiving the oxygen gas determines the scale and operational direction of integrated facility 30. The oxygen depleted air, is further separated so as to supply nitrogen to IGCC gas turbine 53. ASU 39 produced gases, such as without limitation, oxygen and nitrogen, are transported inter-facility by enclosed conduits such as without limitation, pipes, tubes, pressurized lines, or tanks. ASU 39 may utilize any suitable technologies to separate oxygen and nitrogen from air as understood by one skilled in the art. Examples include without limitation, compressors, columns, exchangers, pumps, or combinations thereof.

Figure 4:
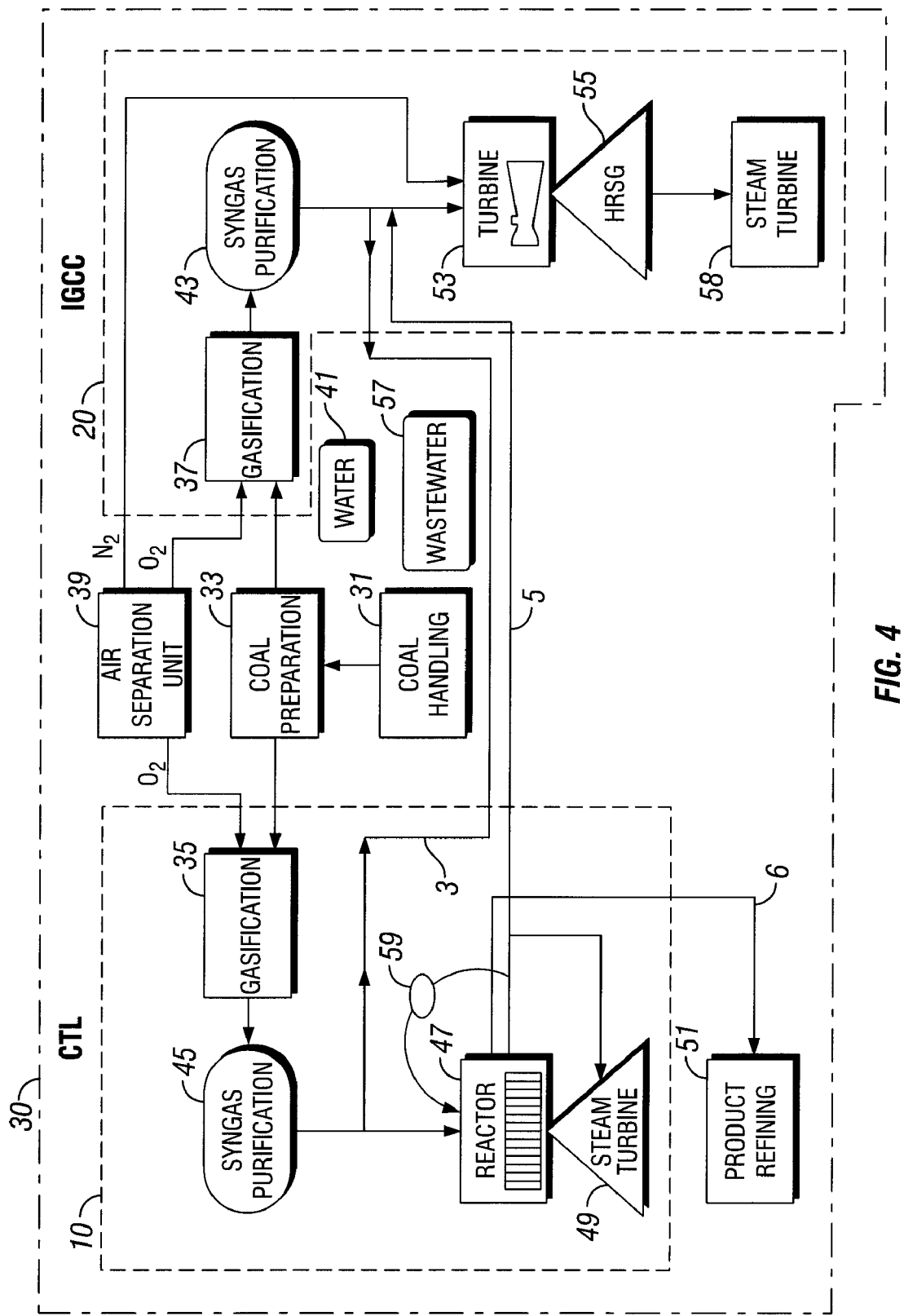
FIG. 4 illustrates detailed process flow diagram according to one embodiment of the method of integrating operations of IGCC and CTL plants.

FIG. 4 illustrates further potential syngas 3 and off-gas sharing between the CTL section 10 and the IGCC section 20 of the integrated facility 30. In embodiments, the off gases, produced by Fischer Tropsch reactors 47 and the off gases from the refining unit 51, can be used to as a co-feed stream 5 with syngas to the IGCC gas turbine 53. As necessary, the Fischer-Tropsch reactors 47 in the CTL section 10 may have the reaction temperature reversibly lowered. By lowering the temperature outside of the favorable reaction range, the result is the complete expulsion of syngas input as tail gas into co-feed stream 5 for feeding to the IGCC turbine 53. Without lowering temperature, reactor 47 creates product stream 6 for product refining facility 51. In certain embodiments, product refining comprises production of diesel, naptha, or other liquid hydrocarbons, without limitation. In further embodiments, the off or tail gases introduced to co-feed stream 5 may be used as a fuel feed to elevate steam temperature at an associated steam turbine generator 49. In alternative embodiments, the off gases from co-feed stream 5 maybe returned to the reactor 47 through a tail gas recycling facility 59.

Further, the IGCC section 20 of the integrated facility 30 may include Fischer Tropsch reactors 47 inline with the syngas supply stream from the purification unit 43 to the IGCC turbine 53. In this manner, the IGCC section 20 may produce additional liquid fuels as market demands dictate. The tail gases produced in the reactors may be used to power the IGCC turbine 53. In cases where electrical power is immediately required, the temperature of the reactor is sufficiently lowered so that the syngas feed stream exits the reactor as unchanged tail gas. The salient details of this embodiment of the IGCC section 20 are disclosed in U.S. Pat. No. 6,976,362, incorporated herein by reference in its entirety for all purposes. In certain instances, this arrangement may comprise a bolt-on CTL facility 10 incorporated into IGCC facility to form an integrated facility 30.

Water may be transported through a system of vessels, pipes, valves, and/or pumps, from the water unit to the entirety of the integrated facility 30. The water may be supplied to the units of the CTL facility 10 including the reactor 47, the product refining 51, the syngas purification 43 and gasification 35 units. In further embodiments, water may be provided to a steam turbine 49 that utilizes heat and steam from the other units to produce quantities of electricity. The other units may comprise any portion of the integrated facility 30, that generates suitable thermal waste, or heat for producing steam. Additionally, water may be routed from the gasification unit 35 to coal preparation unit 33. The coal preparation facility 33 is shared by both CTL 10 and IGCC 20 plants. Water supplied to each unit of the CTL section 10 may be routed through other units in the integrated facility 30, disconnected, or removed completely for treatment off premises, without limitations.

Water may also be transported to the IGCC syngas purification unit 43, the gas turbine 53 and the heat recovery steam generator (hereinafter HRSG) 55. Steam from HRSG is cycled to steam turbine 58. Steam turbine 58 may produce additional electrical power. In further embodiments, water is provided to the IGCC gasification unit 37. The IGCC gasification unit 37 may further provide water to the coal preparation unit 33 shared by the CTL 10 and IGCC 20 sections. Water supplied to each unit of the IGCC section 20 may be routed through other units, disconnected or removed completely, as known to one skilled in the art.

A wastewater treatment unit 57 may be included in the integrated facility 30. The wastewater treatment unit 57 drains the syngas purification units 43, 45, the gasification units 35, 37, the CTL reactor 47, the CTL product refining facilities 51, the coal preparation unit 33, and the IGCC gas turbine 53 of used water. Wastewater removal from individual units of the integrated facility 30 may be alternatively coupled, routed through other units, or omitted from the system. The wastewater may be recycled, reused, or treated and expelled from the integrated facility.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. A method of integrating liquid hydrocarbon and electrical power production facilities, the method comprising:
   providing an amount of coal to a coal preparation unit configured to prepare coal for subsequent gasification;
   dividing the prepared coal into first and second prepared coal feed streams;
   subjecting the first prepared coal feed stream to gasification in a first gasification unit configured to produce a first syngas suitable for the production of liquid hydrocarbons; and
   subjecting the second prepared coal feed stream to gasification in a second gasification unit configured to produce a second syngas suitable for the production of electricity.

2. The method of claim 1 wherein the first gasification unit is a component of a coal to liquid (CTL) facility and the second gasification unit is a component of an Integrated Gasification Combined Cycle (IGCC) facility.

3. The method of claim 1 wherein the first gasification unit is upstream of a Fischer-Tropsch Reactor of the liquid hydrocarbon production facility, wherein the Fischer-Tropsch reactor is configured to convert synthesis gas to liquid hydrocarbons.

4. The method of claim 3 further comprising (a) introducing at least a portion of the first syngas, at least a portion of the second syngas, or at least a portion of both the first syngas and the second syngas into the Fischer-Tropsch reactor, whereby liquid hydrocarbons are produced; (b) introducing at least a portion of the first syngas, at least a portion of the second syngas, or at least a portion of both the first syngas and the second syngas into a gas turbine of the power production facility, whereby electricity is produced; or both (a) and (b).

5. The method of claim 1 further comprising utilizing a first portion of the first syngas produce liquid hydrocarbons and utilizing a second portion of the first syngas to produce electricity.

6. The method of claim 5, wherein the amounts of the first and second portions of the first syngas are adjusted to provide a desired production of liquid hydrocarbons, desired production of electricity, or both.

7. The method of claim 1 further comprising: (a) converting at least a portion of the first syngas to liquid hydrocarbons, converting at least a portion of the second syngas to liquid hydrocarbons, or converting at least a portion of the first syngas and at least a portion of the second syngas to liquid hydrocarbons; (b) producing electricity from at least a portion of the first syngas, producing electricity from at least a portion of the second syngas, or producing electricity from at least a portion of the first syngas and at least a portion of the second syngas; or both (a) and (b); and conveying wastewater produced thereby to a shared wastewater treatment unit.

8. The method of claim 1 further comprising supplying water from a shared water supply to both liquid hydrocarbon and electrical power production facilities.

9. The method of claim 1 further comprising evaluating the relative profitability of the product electricity and liquid hydrocarbons and adjusting the amount of prepared coal in the first and second prepared coal feed streams to enhance the profitability of the method.

10. The method of claim 1 further comprising providing oxygen-enriched gas via an air separation unit (ASU), and utilizing at least a portion of the oxygen-enriched gas in subjecting the first prepared coal feed stream to gasification in the first gasification unit, utilizing at least a portion of the oxygen-enriched gas in subjecting the second prepared coal feed stream to gasification in the second gasification unit, or utilizing a first portion of the oxygen-enriched gas in subjecting the first prepared coal feed stream to gasification in the first gasification unit and utilizing a second portion of the oxygen-enriched gas in subjecting the second prepared coal feed stream to gasification in the second gasification unit.

11. The method of claim 10 wherein a single air separation unit is configured to provide oxygen-enriched air for the first gasification unit and the second gasification unit, and wherein amounts of first and second portions of the oxygen-enriched gas directed to the first gasification unit and the second gasification unit, respectively, are adjusted depending on a desired production of liquid hydrocarbons, a desired production of electricity, or both.

12. The method of claim 1 further comprising utilizing a first portion of the second syngas to produce electricity and a second portion of the second syngas to produce liquid hydrocarbons.

13. The method of claim 12, wherein the amounts of the first and second portions of the second syngas are adjusted to provide a desired production of liquid hydrocarbons, a desired production of electricity, or both.

14. A method of integrating a coal-to-liquid (CTL) facility and an integrated gasification combined cycle (IGCC) facility, the method comprising:
providing a coal preparation unit such that the coal-to-liquid (CTL) facility and the integrated gasification combined cycle (IGCC) facility share the coal preparation unit, wherein the coal preparation unit provides a first coal feed stream for the coal-to-liquid process and a second coal feed stream for the integrated gasification combined cycle facility, and wherein the CTL facility is operable to gasify the first coal feed stream to produce a first syngas suitable for downstream production of liquid hydrocarbons and wherein the IGCC facility is operable to gasify the second coal feed stream to produce a second syngas suitable for downstream power production.

15. The method of claim 14 further comprising supplying at least a portion of the first syngas to the IGCC facility.

16. The method of claim 14 further comprising supplying at least a portion of the second syngas to the CTL facility.

17. The method of claim 14 further comprising transferring at least one product chosen from the group consisting of byproducts, electricity, liquid hydrocarbons, tail gases, exhaust gases, and syngas from the CTL facility to the IGCC facility.

18. The method of claim 14 further comprising transferring at least one product chosen from the group consisting of byproducts, electricity, liquid hydrocarbons, tail gases, exhaust gases, and syngas from the IGCC facility to the CTL facility.

19. The method of claim 14 further comprising running the first syngas through a conversion reactor of the CTL facility unreacted, and delivering at least a portion of the first syngas to the IGCC facility via a tail-gas conduit.

20. The method of claim 14 further comprising providing an air separation unit such that such that the coal-to-liquid facility and the integrated gasification combined cycle facility share the air separation unit, wherein the single air separation unit provides an oxygen-enriched feed stream for both the coal-to-liquid facility and the integrated gasification combined cycle facility.

21. The method of claim 20 further comprising dividing the oxygen-enriched gas produced by the ASU.

22. The method of claim 21 comprising utilizing at least portion of the oxygen-enriched gas in subjecting the first prepared coal feed stream to gasification in the first gasification unit configured to produce the first syngas suitable for the production of liquid hydrocarbons.

23. The method of claim 21 comprising utilizing at least a portion of the oxygen-enriched gas in subjecting the second prepared coal feed stream to gasification in the second gasification unit configured to produce the second syngas suitable for electrical power production.

24. A method of integrating liquid hydrocarbon and electrical power production facilities, the method comprising:
fluidly connecting a coal preparation apparatus with the liquid hydrocarbon production facility and with the power production facility whereby prepared coal may be (a) introduced into a first gasification unit configured to produce a first syngas suitable for the production of liquid hydrocarbons via the liquid hydrocarbon production facility; (b) introduced into a second gasification unit configured to produce a second syngas suitable for power production via the power production facility; or both (a) and (b); and
adjusting the amount of prepared coal introduced into the first and second gasification units from 0% to 100% to provide a desired production of liquid hydrocarbons, a desired production of electricity, or both.

* * * * *

UNITED STATES PATENT AND TRADEMARK OFFICE
CERTIFICATE OF CORRECTION

| | | |
|---|---|---|
| PATENT NO. | : 8,105,403 B2 | |
| APPLICATION NO. | : 12/210728 | |
| DATED | : January 31, 2012 | |
| INVENTOR(S) | : Joseph A. Regnery et al. | |

It is certified that error appears in the above-identified patent and that said Letters Patent is hereby corrected as shown below:

In Col. 8, line 35, please add "a" as shown below:

22. The method of claim 21 comprising utilizing at least a portion of the oxygen-enriched gas in subjecting the first prepare coal feed stream to gasification in the first gasification unit configured to produce the first syngas suitable for production of liquid hydrocarbons.

Signed and Sealed this
Twenty-eighth Day of August, 2012

David J. Kappos
*Director of the United States Patent and Trademark Office*